Figure 1:
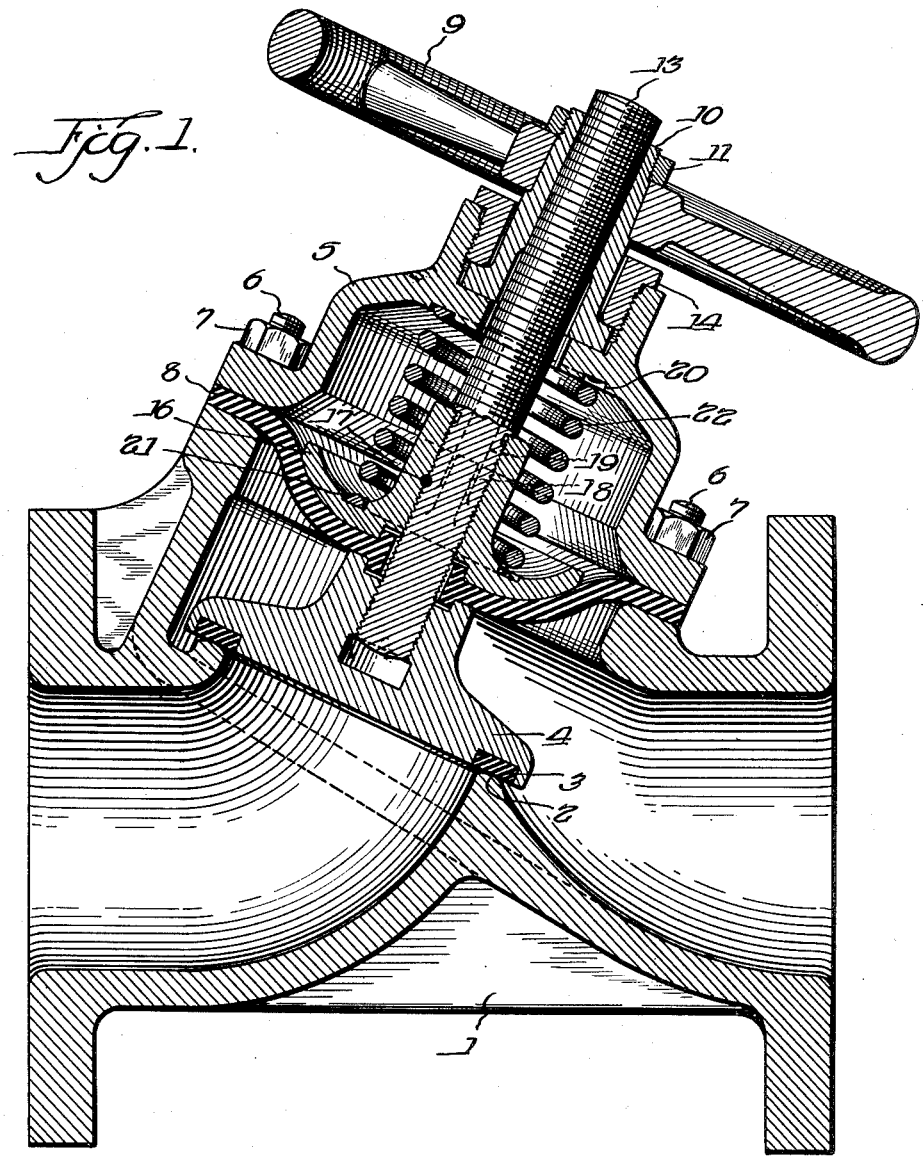

Jan. 5, 1954 J. E. SVABEK, JR 2,665,105
DIAPHRAGM SEALED VALVE
Filed Sept. 7, 1946

Inventor:
John E. Svabek, Jr.
By Joseph O. Lange
Atty.

Patented Jan. 5, 1954

2,665,105

UNITED STATES PATENT OFFICE 2,665,105

DIAPHRAGM SEALED VALVE

John E. Svabek, Jr., Cicero, Ill., assignor to Crane Co., Chicago, Ill., a corporation of Illinois Application September 7, 1946, Serial No. 695,384

1 Claim. (Cl. 251—31)

This invention relates to valves and more particularly it relates to a novel improvement in diaphragm sealed valves.

The advantage of this invention lies in the fact that it provides a diaphragm sealing mechanism which is free from the normal tendency to open the valve of its own accord due to line vibrations and the like while the valve is in the closed position and which is also free from the normal tendency to further open it while the valve is in a throttling position.

Heretofore diaphragm valves made with equal or uniform cross-sectional diaphragms have had a tendency to open from the closed position due to certain vibrations in the piping system. This condition was, of course, very undesirable. The valves, should they be partially open for throttling, would also tend to open further due to certain pressure drop and flow conditions thereby setting up a vibration which was carried through the stem to the stem actuating mechanism where the vibration was transferred to the yoke sleeve hence causing it to revolve. Since there was pressure pushing upwardly on the stem, the movement would be away from the line pressure, and consequently the stem would rise.

I have discovered that if the diaphragm plunger were held down so as to maintain a substantially constant load on the valve disc the tendency for the valve to open while under pressure would be eliminated.

I have also discovered that if the diaphragm plunger were held down so as to also maintain a constant load on the valve stem and therefore take up any play in the stem threads and yoke sleeve threads, the tendency for the diaphragm to vibrate and the tendency for the valve to open further from a throttling position would be eliminated.

Other objects and advantages arising from the construction will become more readily apparent upon proceeding with the following specifications read in light of the accompanying drawings in which:

The single figure is a sectional assembly view of the diaphragm valve showing a preferred construction.

Referring now to the figure, the valve body 1 is shown with its seat 2. The valve disc 3 is a resilient member which is molded into the disc holder 4 to form the disc assembly. The valve bonnet 5 is fastened to the body by means of studs 6 and nuts 7 in the conventional manner with the diaphragm 8 acting as the bonnet gasket as well as the valve seal which will be discussed more fully a little later on.

The handwheel 9 is fastened to the yoke sleeve 10 by the handwheel nut 11. The yoke sleeve is threadedly engaged to the valve stem 13. The handwheel 9 and yoke sleeve 10 assembly is held in place at the top of the valve bonnet 5 by means of a yoke sleeve nut 14. Upon assembly, a follower or plunger 16 is screwed or similarly fastened to the base of the stem 13 over which the diaphragm 8 is placed and held rigid by the assembling of the valve disc assembly 3 and 4. The plunger pin 17 holds the plunger from turning on the stem. The seal formed by this fastening of the diaphragm plus the seal formed in the assembly of the body 1 and bonnet 5 eliminates the usual or conventional stuffing box. Hence the diaphragm 8 forms the sealing means for the valve or may be termed the sealing mechanism therefor. The plunger 16 has two guide ribs 18 which ride in the bonnet guides 19 for keeping it and consequently the stem 13 from rotating. As the handwheel 9 is turned clockwise causing the stem 13 to move downward and hence carry the follower 16 and the diaphragm 8 also downward, the disc 4 moves towards the valve seat 2, and the valve becomes closed.

It should be noted that in the conventional construction of valves of this character when the valve is closed and there is a vibration in the piping system whereby the pressure of the system is bearing against the closed disc, there is a tendency for such line vibration to be transmitted to the stem threads and yoke sleeve threads. The up and down vibration is transferred to one producing a turning of the valve handwheel. With the turning of the handwheel the load on the disc is relieved and eventually the valve is opened. This is of course very objectionable. The essence of my discovery is that this valve opening is eliminated if a spring or other resilient means 22 is inserted between the bonnet 5 and plunger 16 to maintain a substantially constant load on the valve disc. While the valve is in the closed position, the damping or inhibiting action of the spring is sufficient to eliminate any tendency for the valve to open. The guide 20 in the bonnet 5 and the guide 21 in the plunger 16 act as a holding means for the spring to keep it concentric about the stem.

Upon opening the valve the spring 22 is compressed increasing its load on the plunger 16 and the disc or closure member 4. Here the second function of my invention comes into use for now the spring 22 acts as a means of aplying a downward pressure against the stem 13 and consequently the stem threads are held to bear on the lower ridges of the threads in the yoke sleeve and the play in this thread bearing is thus eliminated. Thus when any vibration occurs while the valve is being opened or left in a throttling position the spring aids in damping the vibration transmitted through the disc and diaphragm to the spring itself and the stem. Since the stem threads are held with a sufficient load so as to maintain a downward thrust on the yoke sleeve, there is little chance of any vibration effects causing the threaded yoke sleeve to turn on the stem. Consequently any vibrations present in the valve during throttling or even slowly opening, will be effectively damped.

The spring need not necessarily be a round wire coil as shown, but could be of square or flat stock. It could also be of conical shape and perform the same duty.

I claim:

A diaphragm valve comprising a casing having a valve chamber of substantially cylindrical form except for that lower portion thereof forming a transverse passage interrupting the side wall of the chamber, a flexible diaphragm normally dished and with the outer periphery thereof defining the upper limits of the said valve chamber, a valve stem threaded for substantially its full length and being threadedly secured on both sides of the said diaphragm, a dished plunger threadedly attached to the said stem, a closure member secured to the said stem and bearing in fluid sealing relation against an annular surface portion of the said diaphragm, the said closure member having a flat seat contact defining its lowermost limits, a bonnet closing the upper portion of the said casing, a coiled resilient member supported between said plunger and an interior end wall portion of the said bonnet, a valve seat within the said valve chamber defining the lower limits of the valve chamber, the said bonnet having a chamber portion above and forming a continuation of the said valve chamber, the said closure member having a central threaded portion for receiving an end threaded portion of the said stem, the said plunger also having a central hub portion threaded for substantially its full length for receiving a threaded portion of said stem and retaining said coiled resilient member around said hub portion against transverse displacement in actuating the said valve, an upper surface of the said hub portion when abutting the interior end wall portion of the bonnet defining a stop for inhibiting excessive upward flexing of the said diaphragm and also providing a limit of maximum compression for the said resilient member in the full open position of the valve.

JOHN E. SVABEK, Jr.

References Cited in the file of this patent

UNITED STATES PATENTS

| Number | Name | Date |
|---|---|---|
| 583,546 | Pierson | June 1, 1897 |
| 1,182,030 | O'Dowd | May 9, 1916 |
| 1,442,278 | Le Gore | Jan. 16, 1923 |
| 1,983,106 | Sundstrom | Dec. 4, 1934 |
| 1,990,635 | Buttner | Feb. 12, 1935 |
| 1,996,309 | Simpson | Apr. 2, 1935 |
| 2,136,940 | Ebrecht | Nov. 15, 1938 |
| 2,299,079 | Davis | Oct. 20, 1942 |
| 2,439,052 | McIntosh | Apr. 6, 1948 |

FOREIGN PATENTS

| Number | Country | Date |
|---|---|---|
| 752,652 | France | of 1933 |